United States Patent
Dean-Sioss

(10) Patent No.: US 12,351,717 B2
(45) Date of Patent: Jul. 8, 2025

(54) TREAD RUBBER COMPOSITION WITH MAJORITY RENEWABLE CONTENT

(71) Applicant: The Goodyear Tire & Rubber Company, Akron, OH (US)

(72) Inventor: Stacey Lynne Dean-Sioss, Broadview Heights, OH (US)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 434 days.

(21) Appl. No.: 18/046,190

(22) Filed: Oct. 13, 2022

(65) Prior Publication Data

US 2023/0192998 A1    Jun. 22, 2023

Related U.S. Application Data

(60) Provisional application No. 63/265,703, filed on Dec. 20, 2021.

(51) Int. Cl.
*C08L 9/06* (2006.01)
*B60C 1/00* (2006.01)
*C08L 7/00* (2006.01)

(52) U.S. Cl.
CPC ........ *C08L 9/06* (2013.01); *B60C 1/00* (2013.01); *C08L 7/00* (2013.01)

(58) Field of Classification Search
CPC .............. C08L 9/06; C08L 7/00; B60C 1/00
USPC ....................................................... 523/152
See application file for complete search history.

(56) References Cited

U.S. PATENT DOCUMENTS

| | | | |
|---|---|---|---|
| 4,419,470 A * | 12/1983 | Davis ............... | C08L 9/06 524/274 |
| 8,679,444 B2 | 3/2014 | Noyes | |
| 10,385,192 B2 | 8/2019 | Brace | |
| 10,500,582 B2 | 12/2019 | Noyes | |
| 2003/0096900 A1 | 5/2003 | Holden | |
| 2016/0075864 A1* | 3/2016 | Takeda ............... | C08L 7/00 523/156 |
| 2017/0174873 A1 | 6/2017 | Zhao | |
| 2017/0247531 A1 | 8/2017 | Reuvekamp et al. | |
| 2018/0009971 A1* | 1/2018 | Styer ............... | C08L 91/06 |
| 2018/0163029 A1* | 6/2018 | Brace ............... | C08L 91/00 |
| 2019/0134930 A1* | 5/2019 | Randall ............... | C08L 91/00 |
| 2019/0322844 A1* | 10/2019 | Stroomer ............... | C08J 3/203 |
| 2023/0151189 A1 | 5/2023 | Singh et al. | |

FOREIGN PATENT DOCUMENTS

| | | |
|---|---|---|
| CN | 111499942 A | 8/2020 |
| EP | 2412731 A1 | 2/2012 |
| EP | 3210796 A1 | 8/2017 |
| EP | 3575320 A1 | 12/2019 |
| WO | 2021198090 A1 | 10/2021 |

OTHER PUBLICATIONS

U.S. Appl. No. 17/109,262, filed Dec. 2, 2020.
Extended European Search Report for Application No. 22212905.8, dated May 30, 2023.
Chinese Office Action for Application No. 202211638154.4, dated Nov. 30, 2024.
Chinese Search Report for Application No. 202211638154.4.

\* cited by examiner

*Primary Examiner* — Deve V Hall
(74) *Attorney, Agent, or Firm* — Mandy B. Willis

(57) ABSTRACT

A tire component formed from a rubber composition comprises a majority weight percent of renewable materials. The rubber composition comprises, based on 100 parts per weight (phr) of elastomer:
  a blend of at least two rubber elastomers selected from a group consisting of:
  from about 40 phr to about 50 phr polybutadiene;
  up to about 35 phr of styrene-butadiene copolymer;
  up to about 45 phr of natural rubber;
  a bio-derived resin material; and
  a bio-derived filler comprising silica and carbon black filler. The carbon black filler is at least partially derived from a bio-based feedstock prior to its addition to the rubber composition. The resin and the silica are also derived from renewable materials.

19 Claims, No Drawings

TREAD RUBBER COMPOSITION WITH MAJORITY RENEWABLE CONTENT

FIELD OF THE INVENTION

The present exemplary embodiments relate to a tire rubber composition containing a majority weight percent of renewable content. It finds particular application in conjunction with tread components and will be described with particular reference thereto. However, it is to be appreciated that the present exemplary embodiments are also amenable to other like applications.

BACKGROUND OF THE INVENTION

To improve sustainability in the tire industry, there is an ongoing effort to develop rubber tire compositions from renewable sources. However, sustainable compositions must behave in predicted ways for a tire to perform to its intended purpose. Therefore, a sustainable rubber composition is desired from which there is little to no compromise in rubber performance.

In rubber tire compounds, each material and additive are combined with elastomers to impart specific properties in the resulting tire. Presently, several materials—resin and carbon black being two among them—are derived from a fossil (also referred to herein as "hydrocarbon") fuel source (i.e., petroleum, coal, or natural gas). Emissions from the manufacture of these petroleum-derived materials include organics, sulfur compounds, carbon monoxide (CO), and other contaminants. To lessen the environmental impact of such emissions, there is a desire to reduce, or altogether exclude, from rubber compounds the materials that originate from fossil fuel sources. However, previous technologies have made it difficult for one, let alone a combination of, bio-derived alternative materials to replicate the performance of conventional materials in tire compounds.

To meet the challenge of providing a tire rubber composition from sustainable, bio-renewable, environmentally friendly, and non-fossil fuel sources, it is desired to evaluate a rubber composition formed from a combination of materials including resin derived from a renewable resource.

SUMMARY OF THE INVENTION

One embodiment of the disclosure relates to a tire component formed from a rubber composition comprising a majority weight percent of renewable materials. The rubber composition comprises, based on 100 parts per weight (phr) of elastomer:
a blend of at least two rubber elastomers selected from a group consisting of:
from about 40 phr to about 50 phr polybutadiene;
up to about 35 phr of styrene-butadiene copolymer;
up to about 45 phr of natural rubber;
a bio-derived resin material; and
a bio-derived filler comprising silica and carbon black filler. In the contemplated embodiment, the carbon black filler is at least partially derived from a bio-based feedstock prior to its addition to the rubber composition. The resin and the silica are also derived from renewable materials.

DETAILED DESCRIPTION OF THE INVENTION

The present disclosure relates to a rubber composition containing a majority weight percent of renewable content. The disclosure further relates to a rubber tire having a tire component comprising the compound.

As used herein, the terms "compounded rubber", "rubber compound" and "compound" refer to rubber compositions containing elastomers which have been compounded, or blended, with appropriate rubber compounding ingredients. The terms "rubber" and "elastomer" and "polymer" may be used interchangeably unless otherwise indicated. It is believed that such terms are well known to those having skill in the art.

As used herein, except where context requires otherwise, the term "comprise" and variations of the term, such as "comprising", "comprises" and "comprised", are not intended to exclude further additives, components, integers, or steps. As used herein, the words "from about" means approximately and can includes values ±1 beyond the ones listed herein.

As used herein, the term "bio-based" or "bio-derived" refers to a material derived from a renewable or sustainable resource or natural source, and may even include an industrial source when, for example, a byproduct or waste product is being captured and reused to reduce or eliminate emissions harmful to the environment. One non-limiting example is the sequestration of carbon oxides for use as feedstock.

As used herein, "renewable" and "sustainable" are used interchangeably and hereafter comprises recycled material as well; "content" and "material" are used interchangeably. It partially, and more preferably fully, excludes radiocarbon and fossil carbon materials derived from petroleum, coal, or a natural gas source. Examples of resources from which the bio-based material can be derived include, but are not limited to, fresh (or from the fermentation of) biomass material, such as corn, vegetable oils, etc.

A key aspect of the disclosure is the percent weight content of renewable content achieved using a combination of various renewable materials. A further aspect of the disclosed rubber composition is that the performance of a cured rubber composition with a majority weight percent of renewable content matches or improves on the tread (wet, wear, and rolling resistance) performance of conventional rubber compositions made from petroleum-derived materials.

Rubber Polymer(s)

The disclosed rubber composition comprises a blend of at least two rubber, and more particularly conjugated diene-based, elastomers. In practice, various conjugated diene-based elastomers may be used for the rubber composition such as, for example, polymers and copolymers of at least one of isoprene and 1,3-butadiene and of styrene copolymerized with at least one of isoprene and 1,3-butadiene. Representative of such conjugated diene-based elastomers are, for example, comprised of at least one of cis 1,4-polyisoprene (natural and synthetic), cis 1,4-polybutadiene, styrene/butadiene copolymers, medium vinyl polybutadiene having a vinyl 1,2-content in a range of about 15 to about 90 percent, isoprene/butadiene copolymers, and styrene/isoprene/butadiene terpolymers.

In practice, the preferred rubber or elastomers are polyisoprene (natural or synthetic), polybutadiene and SBR. In further embodiment, the rubber elastomers are polyisoprene and polybutadiene. In one embodiment, the polybutadiene is present in a majority amount. In a preferred embodiment, the polyisoprene is present in a majority amount.

In one embodiment, the rubber composition comprises from about 30 phr to about 60 phr polybutadiene and, more preferably, from about 40 phr to about 50 phr of polybutadiene. In one embodiment, the rubber composition comprises up to 20% weight percent of polybutadiene.

In practice, it is envisioned that the cis 1,4-polybutadiene elastomer may be a neodymium catalyst prepared cis 1,4-polybutadiene rubber which may be prepared, for example, by polymerization of 1,3-polybutadiene monomer in an organic solvent solution in the presence of a catalyst system comprised of neodymium compound. However, such 1,4-polybutadiene can be prepared by organic solution nickel catalysis of cis 1,3-budadiene rubber instead.

Representative of such neodymium catalyst prepared cis 1,4-polybutdiene is, for example, and not intended to be limiting, BUD 1223™ from The Goodyear Tire & Rubber Company and CB25™ from Lanxess.

The cis 1,4-polyisoprene and cis 1,4-polyisoprene natural rubber are well known to those having skill in the rubber art. In practice, a second rubber polymer can include a polyisoprene. In one embodiment, the polyisoprene can be present in a minority amount. In another embodiment, the polyisoprene can be present in a majority amount. In practice, the preferred rubber or elastomers include polyisoprene (natural or synthetic) in some amount. In one embodiment, the rubber composition comprises up to about 45 phr of polyisoprene, preferably in the form of natural rubber. In one embodiment, the rubber composition comprises at least about 35 phr of polyisoprene, preferably in the form of natural rubber. In certain embodiments, the rubber composition comprises from about 35 phr to about 45 phr of polyisoprene in the form of natural rubber. In one embodiment, the rubber composition comprises from about 10 to about 35% weight percent, and more preferably from about 15 to about 30% weight percent, of polyisoprene.

In one contemplated embodiment, at least one rubber polymer includes a styrene-butadiene rubber. Styrene/butadiene copolymers include those prepared by aqueous emulsion polymerization (ESBR) and organic solvent solution polymerization (SSBR). In one embodiment, a solution polymerization prepared SBR (SSBR) is also contemplated, which typically has a bound styrene content in a range of about 9 to about 36 percent. However, embodiments are contemplated in which the SSBR has a bound styrene content of greater than 30 percent, such as 34%.

The rubber composition can comprise up to about 35 phr of the styrene-butadiene rubber. In one embodiment, the rubber composition comprises ESBR and SSBR. In one embodiment, the rubber composition comprises SSBR and excludes ESBR. For embodiments in which the blend of rubber polymers comprises SSBR, the SSBR may be present in an amount of from about 5 phr to about 30 phr and, more preferably, from about 10 to about 25 phr. In certain embodiments, the rubber composition comprises up to about 5% weight percent of SSBR.

The SSBR can be conveniently prepared, for example, by organo lithium catalyzation in the presence of an organic hydrocarbon solvent. In one embodiment, the SSBR is not functionalized. In one embodiment, at least one rubber polymer, such as the SSBR, can be functionalized.

Representative of functionalized elastomers are, for example, styrene/butadiene elastomers containing one or more functional groups comprised of (A) amine functional group reactive with hydroxyl groups on precipitated silica,
(B) siloxy functional group, including end chain siloxy groups, reactive with hydroxyl groups on precipitated silica,
(C) combination of amine and siloxy functional groups reactive with hydroxyl groups on said precipitated silica,
(D) combination of thiol and siloxy (e.g. ethoxysilane) functional groups reactive with hydroxyl groups on the precipitated silica,
(E) combination of imine and siloxy functional groups reactive with hydroxyl groups on the precipitated silica,
(F) hydroxyl functional groups reactive with the precipitated silica.

For the functionalized elastomers, representatives of amine functionalized SBR elastomers are, for example, in-chain functionalized SBR elastomers mentioned in U.S. Pat. No. 6,936,669.

Representative of a combination of amino-siloxy functionalized SBR elastomers with one or more amino-siloxy groups connected to the elastomer is, for example, HPR355™ from JSR and amino-siloxy functionalized SBR elastomers mentioned in U.S. Pat. No. 7,981,966.

Representative styrene/butadiene elastomers end functionalized with a silane-sulfide group are, for example, mentioned in U.S. Pat. Nos. 8,217,103 and 8,569,409.

It is further contemplated that, in certain embodiments, the rubber elastomer may be a butyl type rubber, particularly copolymers of isobutylene with a minor content of diene hydrocarbon(s), such as, for example, isoprene and halogenated butyl rubber.

It is further contemplated that, in certain embodiments, the elastomer may comprise a halobutyl rubber comprising a blend consisting of clorobutyl rubber, bromobutyl rubber and mixtures thereof.

Tin coupled elastomers may also be used, such as, for example, tin coupled organic solution polymerization prepared styrene/butadiene co-polymers, isoprene/butadiene copolymers, styrene/isoprene copolymers, polybutadiene and styrene/isoprene/butadiene terpolymers including the aforesaid functionalized styrene/butadiene elastomers.

Oil

By desiring the rubber composition to contain fewer to no materials derived from petroleum, it is meant that the rubber composition will contain minimal, if any, petroleum-based processing oil. For example, it is desired that the rubber composition be limited to from zero to about 5 phr of petroleum-based processing oil and, more preferably, less than about 2 phr of rubber petroleum-based processing oil.

In one embodiment, the rubber composition may comprise up to about 20 phr of rubber processing oil. In another embodiment, the rubber composition may comprise no less than about 1 phr of rubber processing oil. In practice, the composition may comprise from about 1 to about 20 phr of rubber processing oil and, more preferably, from about 15 to about 20 phr of rubber processing oil. Processing oil may be included in the rubber composition as extending oil typically used to extend elastomers. Processing oil may also be included in the rubber composition by addition of the oil directly during rubber compounding. The processing oil used in the rubber composition may include both extending oil present in the elastomers and process oil added during compounding. Suitable process oils include various oils as are known in the art, including aromatic, paraffinic, naphthenic, vegetable triglyceride oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analyis & Testing of Petroleum and Related Products* and *British Standard* 2000 Parts, 2003, 62$^{nd}$ edition, published by the Institute of Petroleum, United Kingdom.

A suitable vegetable triglyceride oil is comprised of a combination of saturated and unsaturated esters where the unsaturated esters are comprised of a combination of at least one of oleic acid ester, linoleate acid ester and linoleate acid ester. The saturated esters may be comprised of, for example, and not intended to be limiting, at least one of stearic acid ester and palmitic acid ester.

In one embodiment, the vegetable triglyceride oil is comprised of at least one of soybean oil, sunflower oil, rapeseed oil, and canola oil, which are in the form of esters containing a certain degree of unsaturation. Other suitable examples of vegetable triglyceride oil include corn, coconut, cottonseed, olive, palm, peanut, and safflower oils. In practice, the oil includes at least one of soybean oil and sunflower oil.

In the case of soybean oil, for example, the above represented percent distribution, or combination, of the fatty acids for the glycerol tri-esters, namely the triglycerides, is represented as being an average value and may vary somewhat depending primarily on the type, or source of the soybean crop, and may also depend on the growing conditions of a particular soybean crop from which the soybean oil was obtained. There are also significant amounts of other saturated fatty acids typically present, though these usually do not exceed 20 percent of the soybean oil.

The contemplated embodiment comprises between about 1% and 10% weight percent of a bio-derived rubber processing oil in the composition. In one embodiment, the rubber processing oil material makes up from about 3% weight percent and 8% weight percent of the composition.

Resin

A critical aspect of the present disclosure is the use of a bio-derived resin material, partially, but preferably fully, in place of a petroleum resin. Conventional resins are derived from petroleum. These type of resins include any hydrocarbon chemistry type resin (AMS, coumarone-indene, C5, C9, C5/C9, DCPD, DCPD/C9, others) & any modification thereof (phenol, C9, hydrogenation, recycled monomers, others). While these type of resins are contemplated for use in one embodiment of the invention, the preferred embodiment instead employs a renewable biobased chemistry type resin & modification and mixture thereof. Representative resins can also include coumarone type resins, including coumarone-indene resins and mixtures of coumarone resins, naphthenic oils, phenol resins, and rosins. Other suitable resins include phenol-terpene resins such as phenol-acetylene resins, phenol-formaldehyde resins, alkyl phenol-formaldehyde resins, terpene-phenol resins, polyterpene resins, and xylene-formaldehyde resins.

Terpene-phenol resins may be used. Terpene-phenol resins may be derived by copolymerization of phenolic monomers with terpenes such as limonenes, pinenes and delta carene. In one embodiment, the resin can be an alpha pinene resin characterized by a softening point Tg between 60° C. and 130° C.

In one embodiment, the resin is a resin derived from rosin and derivatives. Representative thereof are, for example, gum rosin, wood rosin and tall oil rosin. Gum rosin, wood rosin and tall oil rosin have similar compositions, although the amount of components of the rosins may vary. Such resins may be dimerized, polymerized or disproportionated. Such resins may be in the form of esters of rosin acids and polyols such as pentaerythritol or glycol.

In one embodiment, said resin may be partially or fully hydrogenated.

In one embodiment, the rubber composition comprises from about 10 to about 80 phr of at least one resin and, more preferably, from about 10 to about 80 phr of a bio-derived resin, although embodiments are contemplated in which another resin of a different type can be added to the composition as well. In one embodiment, the rubber composition comprises no less than 15 phr of resin and, more preferably, no less than about 20 phr of resin. In one embodiment, the rubber composition comprises no less than 20 phr of resin and no more than 60 phr of resin.

The contemplated embodiment comprises between about 10% and 15% weight percent of a bio-resin material in the composition. In one embodiment, the resin material makes up from about 12% weight percent and 15% weight percent of the composition.

Filler

The disclosed rubber composition comprises 80-150 phr of silica filler. In one embodiment, the composition comprises at least 90 phr of silica. In one embodiment, the composition comprises no less than 100 phr of silica.

In one embodiment, the precipitated silica is comprised of:
(A) a precipitated silica derived from inorganic sand (silicon dioxide based sand), or
(B) a precipitated silica derived from rice husks (silicon dioxide containing rice husks).

In one embodiment the precipitated silica is derived from naturally occurring inorganic sand (e.g. $SiO_2$, silicon dioxide, which may contain a trace mineral content). The inorganic sand is typically treated with a strong base such as, for example, sodium hydroxide, to form an aqueous silicate solution (e.g. sodium silicate). A synthetic precipitated silica is formed therefrom by controlled treatment of the silicate with an acid (e.g. a mineral acid and/or acidifying gas such as, for example, carbon dioxide). Sometimes an electrolyte (e.g. sodium sulfate) may be present to promote formation of precipitated silica particles. The recovered precipitated silica is an amorphous precipitated silica.

In a preferred embodiment, the precipitated silica is a rice husk derived precipitated silica. Such precipitated silica is from derived rice plant husks (e.g. burnt ashes from rice husks) which contain $SiO_2$, silicon dioxide, and which may contain trace minerals from the soil in which the rice has been planted). In a similar methodology, the rice husks (e.g. rice husk ash) is typically treated with a strong base such as, for example, sodium hydroxide, to form an aqueous silicate solution (e.g. sodium silicate) following which a synthetic precipitated silica is formed therefrom by controlled treatment of the silicate with an acid (e.g. a mineral acid and/or acidifying gas such as, for example, carbon dioxide) in which an electrolyte (e.g. sodium sulfate) may be present to promote formation of precipitated silica particles derived from rice husks. The recovered precipitated silica is an amorphous precipitated silica. For Example, see U.S. patent application Ser. No. 2003/0096900. In a preferred embodiment, the rubber composition comprises between 30 and 40 weight percent of rice husk ash silica and, more preferably, between 34 and 37 weight percent of rice husk ash silica.

The precipitated silica, whether derived from the aforesaid silicon dioxide or rice husks, may, for example, have a BET surface area, as measured using nitrogen gas, in the range of, for example, about 40 to about 600, and more usually in a range of about 50 to about 300 square meters per gram. The BET method of measuring surface area might be described, for example, in the *Journal of the American Chemical Society*, Volume 60, as well as ASTM D3037.

Such precipitated silicas may, for example, also have a dibutyl phthalate (DBP) absorption value, for example, in a range of about 100 to about 400, and more usually about 150 to about 300 cc/100 g.

Other embodiments are contemplated in which the silica is used in combination with another filler, such as carbon black.

In one embodiment, the rubber composition optionally comprises, based on 100 parts by weight (phr) of elastomer, from about 0 to about 50 phr of carbon black. In one embodiment, the rubber composition comprises no more than 20 phr of carbon black. In another embodiment, the rubber composition comprises no less than 0.1 phr of carbon black and, in certain embodiments, no less than 1 phr of carbon black. In one embodiment, the rubber composition comprises from about 1 to about 15 phr of carbon black. In a preferred embodiment, the carbon black is a bio-based carbon black.

The ASTM-D6866 method to derive "bio-based" content is built on the same concepts as radiocarbon dating, but without use of the age equations. The method relies on determining a ratio of the amount of radiocarbon ($^{14}C$) in an unknown sample to that of a modern reference standard. The ratio is reported as a percentage with the units "pMC" (percent modern carbon). If the material being analyzed is a mixture of present-day radiocarbon and fossil carbon (fossil carbon being derived from petroleum, coal or a natural gas source), then the obtained pMC value correlates directly to the amount of biomass material present in the sample.

The modern reference standard used in radiocarbon dating is a National Institute of Standards and Technology USA (NIST-USA) standard with a known radiocarbon content equivalent approximately to the year AD 1950, before excess radiocarbon was introduced into the atmosphere. AD 1950 represents zero (0) years old and 100 pMC. Present day (fresh) biomass materials, and materials derived therefrom, give a radiocarbon signature near 107.5.

The radiocarbon dating isotope (14C) has a nuclear half-life of 5730 years. Fossil carbon, depending upon its source, has very close to zero 14C content. By presuming that 107.5 pMC represents present day biomass materials and 0 pMC represents petroleum (fossil carbon) derivatives, the measured pMC value for a material will reflect the proportions of the two component types. Thus, a material derived 100% from present day vegetable oil would give a radiocarbon signature near 107.5 pMC. If that material was diluted with 50% petroleum derivatives, it would give a radiocarbon signature near 54 pMC.

A biomass content result is derived by assigning 100% equal to 107.5 pMC and 0% equal to 0 pMC. In this regard, a sample measuring 99 pMC will give an equivalent bio-based content result of 93%. This value is referred to as the "mean biobased result" and assumes all the components within the analyzed material were either present day living or fossil in origin.

The results provided by the ASTM D6866 method are the mean biobased result and encompass an absolute range of 6% (±3%) on either side of the mean bio-based result) to account for variations in end-component radiocarbon signatures. It is presumed that all materials are present day or fossil in origin. The result is the amount of bio-based component "present" in the material—not the amount of bio-based material "used" in the manufacturing process.

In one embodiment, a tire component is formed from a rubber composition comprising a carbon black filler having a greater than one percent (1%) modern carbon content as defined by ASTM D6866. The carbon black is produced from a bio-based feedstock prior to its addition to the rubber composition. In one embodiment, the carbon black is at least partially derived from a bio-based feedstock and, in a preferred embodiment, is completely devoid of fossil carbon.

In one embodiment, the bio-based feedstock, from which the carbon black is derived, comprises at least one triglyceride vegetable oil, such as, for example, soybean oil, sunflower oil, canola oil, rapeseed oil, or combinations thereof. In one embodiment, the bio-based feedstock, from which the carbon black is derived, comprises at least one plant biomass, animal biomass and municipal waste biomass, or combinations thereof.

In one embodiment, the carbon black has at least 1% modern carbon content. In one embodiment, the carbon black has at least about 10% and, more preferably, at least about 25% and, most preferably, at least about 50% modern carbon content. In one embodiment, the carbon black has a biomass content result of at least about 1 pMC and, more preferably, at least about 54 pMC. In one embodiment, the carbon black may have a biomass content result of at least about 80 pMC.

Other embodiments are contemplated that employ a carbon-dioxide generated carbon reinforcing filler. Suitable carbon dioxide-generated carbon reinforcement may be produced using methods as described in U.S. Pat. Nos. 8,679,444; 10,500,582; and U.S. Ser. No. 17/109,262—the contents of which are each incorporated in their entirety herein. both of which are fully incorporated herein by reference.

Various combinations of carbon blacks (of differing particle sizes and/or other properties, including conventional, petroleum-carbon black) can also be employed in the disclosed rubber composition. Representative examples of rubber reinforcing carbon blacks are, for example, and not intended to be limiting, referenced in The Vanderbilt Rubber Handbook, 13th edition, 1990, on Pages 417 and 418 with their ASTM designations. Such rubber reinforcing carbon blacks may have iodine absorptions ranging from, for example, 60 to 240 g/kg and DBP values ranging from 34 to 150 cc/100 g.

Coupling Agent

Representative of silica coupler for said precipitated silica are:
(A) bis(3-trialkoxysilylalkyl) polysulfide containing an average in range of from about 2 to about 4, alternatively from about 2 to about 2.6 or from about 3.2 to about 3.8, sulfur atoms in its connecting bridge, or
(B) an alkoxyorganomercaptosilane, or
(C) their combination.

Representative of such bis(3-trialkoxysilylalkyl) polysulfide is comprised of bis(3-triethoxysilylpropyl) polysulfide.

The silica, discussed supra, is desirably added to the rubber composition in combination with the bis(3-triethoxysilylpropyl) polysulfide for reaction thereof in situ within the rubber composition.

In one embodiment, the composition comprises between about 1 phr and about 20 phr of coupling agent and, more preferably, between from about 8 phr and about 12 phr of coupling agent.

Processing Aid—Fatty Acid Derivatives

Another aspect of the present disclosure is the addition of a bio-derived processing aid for the rubber composition. In a preferred embodiment, the processing aid can be a blend of bio-based fatty acid derivatives and/or bio-based fatty acid derivative(s). The processing aid can have a softening point (Tg) in the range of from about 105° C. to about 120° C. Generally, from about 0.5 to about 5 phr and, more preferably, from about 1 to about 3 phr of processing aid may be comprised in the composition. In a contemplated embodiment, the processing aid be obtained as ZB 49 from Struktol® or others. In some embodiments, the processing aid can be used to promote coupling between a coupling agent, silica filler and/or moieties on the polymer to the network between the polymers.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators, accelerators and retarders and processing additives, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts.

Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1 to 6 phr being preferred. Typical amounts of antioxidants comprise about 0.5 to about 5 phr. Representative antioxidants may be, for example, polymerized trimethyl dihydroquinoline, mixture of aryl-p-phenylene diamines, and others, such as, for example, those disclosed in The Vanderbilt Rubber Handbook (1978), pages 344 through 346. In the preferred embodiment, the antioxidant is a lignin-based antioxidant. Typical amounts of antiozonants comprise about 1 to 5 phr. A non-limiting representative antiozonant can be, for example, N-(1,3 dimethyl butyl)-n'-phenyl-p-phenylenediamine. Typical amounts of fatty acids, if used, which can include stearic acid as an example, can comprise about 0.5 to about 5 phr. Typical amounts of zinc oxide comprise about 1 to about 5 phr. In a preferred embodiment, the zinc oxide is derived from recycled content. Typical amounts of waxes comprise about 1 to about 5 phr. Often microcrystalline waxes are used, but refined paraffin waxes or combinations of both can be used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.2 to about 3, preferably about 2 to about 2.5 phr. In another embodiment, combinations of a primary and a secondary accelerator might be used with the secondary accelerator being used in total amounts ranging from about 0.2 to about 3, preferably about 2 to about 2.5 phr., in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. A nonlimiting example of a retarder can be N-cyclohexylthiophthalimide (CTP). Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide, such as, for example, N-cyclohexyl-2-benzothiazolesulfenamide (CBS). If a second accelerator is used, the secondary accelerator is preferably a guanidine (such as diphenyl guanidine (DPG)), dithiocarbamate (such as zinc dimethyl di-thiocarbamate or zinc dibenzyl di-thiocarbamate) or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

Vulcanization of a pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The disclosure contemplates a tire component formed from such method. Similarly, the tire component may be incorporated in a tire. The tire component can be ground contacting or non-ground contacting. The tire can be pneumatic or non-pneumatic. In one embodiment, the tire component can be a tread.

The tire of the present disclosure may be a race tire, passenger tire, aircraft tire, agricultural, earthmover, off-the-road, truck (commercial or passenger) tire, and the like. Preferably, the tire is a passenger or truck tire. The tire may also be a radial or bias, with a radial being preferred.

The rubber composition itself, depending largely upon the selection and levels of renewable materials, may also be useful as a tire sidewall or other tire components or in rubber tracks, conveyor belts or other industrial product applications, such as windshield wiper blades, brake diaphragms, washers, seals, gaskets, hoses, conveyor belts, power transmission belts, shoe soles, shoe foxing and floor mats for buildings or automotive applications.

The following examples are presented for the purposes of illustrating and not limiting the present invention. All parts are parts by weight unless specifically identified otherwise.

EXAMPLES

In these examples, the effects of the disclosed combinations of renewable content on the performance of a rubber compound are illustrated. Rubber compositions were mixed in a multi-step mixing procedure following the recipes in Tables 1-6.

Control rubber compound Samples A, D, F, K, N and Q were formed of equal amounts of like ingredients. These Control Samples were formed using a blend of polybutadiene BR, emulsion polymerized styrene butadiene copolymer ESBR and solution polymerized styrene butadiene polymer ESBR with additive materials including oil (soybean), a carbon black filler, a bio-based silane coupling agent, waxes, antiozonant, a lignin-based antioxidant, a blend of bio-based fatty acid derivatives, and a recycled zinc oxide. The Controls were also formed using alpha methyl styrene resin, which is derived from petroleum. Standard curing techniques were also used.

Example 1

Experimental Samples B and C are shown in Table 1. In Samples B and C, the petroleum resin is replaced with a bio-derived resin—more particularly, alpha pinene resin. Sample C also contains an eight percent (8%) increase in sulfur and an accelerator over Control A, with all other ingredients and amounts being the same.

The rubber compounds were then cured and tested for various properties including, inter alia, wear, wet traction, and rolling resistance, etc.

The basic formulations are shown in the following Table 1, which is presented in parts per 100 parts by weight of elastomer (phr). Table 1 also compares the cured properties of Control Sample A and Experimental Samples B and C.

TABLE 1

|  | Samples | | |
|---|---|---|---|
|  | Control | Experimental | |
|  | A | B | C |
| BR[1] | 44 | 44 | 44 |
| ESBR | 31 | 31 | 31 |
| SSBR[2] | 30 | 30 | 30 |
| Resin A[3] | 20 | 0 | 0 |
| Resin B[4] | 0 | 20 | 20 |
| Silica | 95 | 95 | 95 |
| Sulfur | 1.35 | 1.35 | +8% |
| Accelerator[5] | 2 | 2 | +8% |
| Viscosity, RPA at 100° C. | | | |
| G', 15% (MPa) | 0.228 | 0.223 | 0.228 |
| Cure State | | | |
| Delta Torque (dNm) | 19.3 | 18.3 | 22.7 |
| T25 (min) | 7.3 | 6.3 | 6.2 |
| T90 (min) | 13.5 | 12.9 | 12.3 |
| Stiffness | | | |
| RPA G', 1% (MPa) | 4.134 | 4.009 | 4.046 |
| RPA G' 50% (MPa) | 0.874 | 0.760 | 0.807 |
| ARES at 30° C., G' (Pa) | 6.34E±06 | 5.17E±06 | 4.72E±06 |
| Chip/Flake | | | |
| True Tensile | 134 | 147 | 139 |
| Wet Indicator | | | |
| Rebound at 0° C. (%) | 21.6 | 21.4 | 21.1 |
| ARES TD at 0° C. | 0.402 | 0.417 | 0.459 |
| Wear Indicators | | | |
| DIN Abrasion (relative volume loss) | 63 | 72 | 71 |
| Grosch Abrasion High Severity (mg/km) | 607 | 566 | 565 |
| Snow Indicator | | | |
| ARES G' at −20° (Pa) | 1.85E±07 | 1.55E±07 | 1.41E±07 |
| RR Indicator | | | |
| Rebound at 60° C. (%) | 42.1 | 41.8 | 42.1 |
| ARES TD at 30° C. | 0.310 | 0.320 | 0.339 |

[1]Polybutadiene, Nd catalyzed
[2]Solution polymerized styrene butadiene rubber, 33% Styrene, 20 phr oil extended
[3]Alphamethyl styrene resin
[4]Bio-based terpene resin obtained as SYLVATRAXX 8115 from Kraton Chemical
[5]CBS Table 1 displays a slight directional shift to lower stiffness between Experimental Sample B and Control A when the petroleum-derived resin is replaced with a bio-derived resin. An increase in sulfur and an accelerator between Experimental Sample C and Experimental Sample B—both formed using the bio-derived resin—was made to adjust for the change. This improved the delta torque value of Sample C, which is a better match to Control A.

Altogether, similar performance indicators were observed between the Experimental Samples B and C and Control A. It is concluded that compound performance is not impacted with a sustainably sourced resin in used place of a petroleum-based resin.

Example 2

Experimental Sample E is shown in Table 2. In Sample E, the conventional petroleum-derived carbon black is replaced with a bio-derived carbon black. Sample E contains a greater amount of carbon black over Control D, with all other amounts being the same.

The rubber compounds were then cured and tested for various properties including, inter alia, wear, wet traction, and rolling resistance, etc.

The basic formulations are shown in the following Table 2, which is presented in parts per 100 parts by weight of elastomer (phr). Table 2 also compares the cured properties of Control Sample D and Experimental Sample E.

TABLE 2

|  | Samples | |
| --- | --- | --- |
|  | Control D* | Experimental E |
| Carbon Black (petroleum based) | 2 | 0 |
| Carbon Black (bio-based)[1] | 0 | 8 |
| Viscosity, RPA at 100° C. | | |
| G', 15% (MPa) | 0.228 | 0.261 |
| Stiffness | | |
| RPA G', 1% (MPa) | 4.134 | 4.497 |
| RPA G' 50% (MPa) | 0.874 | 0.862 |
| ARES at 30° C., G' (Pa) | 6.34E+06 | 2.00E+06 |
| Chip/Flake | | |
| True Tensile | 134 | 116 |

TABLE 2-continued

|  | Samples | |
| --- | --- | --- |
|  | Control D* | Experimental E |
| Wet Indicator | | |
| Rebound at 0° C. (%) | 21.6 | 21.4 |
| ARES TD at 0° C. | 0.402 | 0.443 |
| Wear Indicators | | |
| DIN Abrasion (relative volume loss) | 63 | 70 |
| Grosch Abrasion High Severity (mg/km) | 607 | 698 |
| Snow Indicator | | |
| ARES G' at −20° (Pa) | 1.85E±07 | 1.84E±07 |
| RR Indicator | | |
| Rebound at 60° C. (%) | 42.1 | 42.5 |
| ARES TD at 30° C. | 0.310 | 0.335 |

*Same formula as Control Sample A, above
[1] Carbon black derived from $CO_2$ feedstock Table 2 displays an increase in low strain stiffness between Experimental Sample E and Control D when the petroleum-derived carbon black is replaced with a bio-derived carbon black.

Altogether, the bio-derived carbon black was shown to have no noticeable impact on compound properties. It is concluded that the bio-derived carbon black can be used as a colorant without significantly impacting compound performance.

Example 3

Experimental Samples G-J are shown in Table 3. In Samples G-J, the ESBR is replaced with natural rubber along with a reduction in SSBR. Sample G uses the conventional petroleum-derived resin with the modified rubber blend. Samples H-J replace the petroleum-derived resin with the bio-derived resin material. Samples I and J use an increased amount of the bio-derived resin material over Sample H. Sample J also increases the amount of silica filler over samples F-I. Minor cure adjustments were made between Samples H, I, and J, with all other ingredient amounts remaining the same.

The rubber compounds were then cured and tested for various properties including, inter alia, wear, wet traction, and rolling resistance, etc.

The basic formulations are shown in the following Table 3, which is presented in parts per 100 parts by weight of elastomer (phr). Table 3 also compares the cured properties of Control Sample F and Experimental Samples G-J.

TABLE 3

|  | Samples | | | | |
| --- | --- | --- | --- | --- | --- |
|  | Control | Experimental | | | |
|  | F* | G | H | I | J |
| BR[1] | 44 | 44 | 44 | 44 | 44 |
| ESBR | 31 | 0 | 0 | 0 | 0 |
| SSBR[2] | 30 | 24 | 24 | 24 | 24 |
| Natural Rubber | 0 | 36 | 36 | 36 | 36 |
| Resin A[3] | 20 | 20 | 0 | 0 | 0 |
| Resin B[4] | 0 | 0 | 20 | 40 | 40 |
| Silica | 95 | 95 | 95 | 95 | 105 |

TABLE 3-continued

| | Samples | | | | |
|---|---|---|---|---|---|
| | Control | Experimental | | | |
| | F* | G | H | I | J |
| Viscosity, RPA at 100° C. | | | | | |
| G', 15% (MPa) | 0.181 | 0.215 | 0.183 | 0.129 | 0.149 |
| Stiffness | | | | | |
| RPA G', 1% (MPa) | 3.805 | 4.282 | 3.733 | 2.116 | 2.780 |
| RPA G' 50% (MPa) | 0.816 | 0.745 | 0.648 | 0.447 | 0.457 |
| ARES at 30° C., G' (Pa) | 4.92E+06 | 5.31E+06 | 5.76E+06 | 3.73E+06 | 4.69E+06 |
| Chip/Flake | | | | | |
| True Tensile | 149 | 133 | 135 | 128 | 125 |
| Wet Indicator | | | | | |
| Rebound at 0° C. (%) | 21.2 | 23.8 | 24.0 | 16.7 | 16.0 |
| ARES TD at 0° C. | 0.439 | 0.358 | 0.350 | 0.437 | 0.446 |
| Wear Indicators | | | | | |
| DIN Abrasion (relative volume loss) | 66 | 50 | 39 | 81 | 76 |
| Grosch Abrasion High Severity (mg/km) | 462 | 419 | 338 | 298 | 271 |
| Snow Indicator | | | | | |
| ARES G' at −20° (Pa) | 1.54E+07 | 1.39E+07 | 1.46E+07 | 1.30E+07 | 1.58E+07 |
| RR Indicator | | | | | |
| Rebound at 60° C. (%) | 43.0 | 45.5 | 47.0 | 44.6 | 41.7 |
| ARES TD at 30° C. | 0.327 | 0.279 | 0.281 | 0.320 | 0.336 |

*Same formula as Control Samples A and D, above
[1] Polybutadiene, Nd catalyzed
[2] Solution polymerized styrene butadiene rubber, 33% Styrene, 20 phr oil extended
[3] Alphamethyl styrene resin
[4] Bio-based terpene resin obtained as SYLVATRAXX 8115 from Kraton Chemical In Example 3, the rubber polymer blend was adjusted to shift to a lower polymer Tg. The Experimental Samples G-J were tested to evaluate the impact of the bio-derived resin and/or silica at increasing levels on predicted performance.

By switching to natural rubber, Sample H demonstrated an increase in low strain stiffness. The shift to the lower polymer Tg resulted in a negative impact to wet indicators, but showed improved wear, snow and rolling resistance indicators.

By doubling the amount of bio-derived resin, Sample I demonstrated a significant improvement in wet indicators, but at the expense of rolling resistance. The increase in plasticizer level was directionally beneficial for the snow indicator. Overall, the compound stiffness was reduced.

By adding more silica in combination with the other changes, Sample J demonstrated that the stiffness was recovered. The snow indicator was also shown to be equivalent to the Control F.

It is concluded that performance characteristics can be controllably impacted, and the percent of renewable/sustainable content can be adjusted, by increasing the amount of bio-derived resin material and silica in a tire. Such polymer composition can be incorporated into a tire tread.

Example 4

Experimental Sample L, shown in Table 4, modifies sample J (which used an increased amount of bio-derived resin material), supra, by further replacing the petroleum-derived carbon black with equal parts of bio-derived carbon black. In Sample M, the non-functionalized SSBR of Control K and Sample L is replaced with a functionalized SSBR. Soybean oil levels were also adjusted accordingly to maintain the plasticizer level of the oil-extended SSBR of Samples K and L.

Minor cure adjustments were made between Samples H, I, and J, with all other ingredient amounts remaining the same. All other ingredients and amounts of Sample L are the same as Sample J, which comprises the bio-derived resin over the petroleum resin of Control K and a greater amount of silica filler. Minor cure adjustments were also made to Sample K.

The rubber compounds were then cured and tested for various properties including, inter alia, wear, wet traction, and rolling resistance, etc.

The basic formulations are shown in the following Table 4, which is presented in parts per 100 parts by weight of elastomer (phr). Table 4 also compares the cured properties of Control Sample K and Experimental Samples L and M.

TABLE 4

| | Samples | | |
| --- | --- | --- | --- |
| | Control | Experimental | |
| | K* | L** | M |
| BR[1] | 44 | 44 | 45.4 |
| ESBR | 31 | 0 | 0 |
| Natural Rubber | 0 | 36 | 36 |
| SSBR A[2] | 30 | 24 | 0 |
| SSBR B[3] | 0 | 0 | 18.6 |
| Resin A[4] | 20 | 0 | 0 |
| Resin B[5] | 0 | 40 | 40 |
| Silica[6] | 95 | 105 | 105 |
| Carbon Black (petroleum based) | 2 | 0 | 0 |
| Carbon Black (bio-based)[7] | 0 | 2 | 2 |
| Viscosity, RPA at 100° C. | | | |
| G', 15% (MPa) | 0.192 | 0.157 | 0.179 |
| Stiffness | | | |
| RPA G', 1% (MPa) | 3.828 | 2.755 | 2.798 |
| RPA G' 50% (MPa) | 0.782 | 0.495 | 0.520 |
| ARES at 30° C., G' (Pa) | 4.66E+06 | 3.71E+06 | 4.57E+06 |
| Chip/Flake | | | |
| True Tensile | 159 | 118 | 105 |
| Wet Indicator | | | |
| Rebound at 0° C. (%) | 21.2 | 14.1 | 15.7 |
| ARES TD at 0° C. | 0.459 | 0.507 | 0.422 |
| Wear Indicators | | | |
| DIN Abrasion (relative volume loss) | 60 | 84 | 73 |
| Grosch Abrasion High Severity (mg/km) | 396 | 337 | 288 |
| Snow Indicator | | | |
| ARES G' at −20° (Pa) | 1.46E+07 | 1.38E+07 | 1.51E+07 |
| RR Indicator | | | |
| Rebound at 60° C. (%) | 42.2 | 40.4 | 41.6 |
| ARES TD at 30° C. | 0.340 | 0.363 | 0.304 |

*Same formulation as Control Samples A, D and F, above
**Same formulation as Sample J above, except with addition of bio-based carbon black
[1]Solution polymerized styrene butadiene rubber, 33% Styrene, 20 phr oil extended
[2]SSBR, 33% styrene, 20 phr oil extended
[3]SSBR, 21% styrene, functionalized, Sn
[4]Alphamethyl styrene resin
[5]Bio-based terpene resin obtained as SYLVATRAXX 8115 from Kraton Chemical
[6]Rice husk ash silica
[7]Carbon black derived from $CO_2$ feedstock Example 2 showed no impact on compound properties when petroleum-derived carbon black is replaced with bio-derived carbon black. Here the combination of bio-derived carbon black and bio-derived resin material is tested with the high silica content and a functionalized SBR. The use of the functionalized SBR in place of non-functionalized SBR demonstrated an improved rolling resistance. Minimal impact was observed to other performance indicators. Thus, it is concluded that a functionalized polymer can be used in a tire tread rubber composition with multiple other bio-derived materials.

Example 5

Experimental Sample O is the same formula as Sample M, supra. Sample P adjusts the polymer ratio of Sample O, with all other ingredients and amounts being the same. This change led to an increase in the percent amount of renewable material (content) in the composition.

The rubber compounds were then cured and tested for various properties including, inter alia, wear, wet traction, and rolling resistance, etc.

The basic formulations are shown in the following Table 5, which is presented in parts per 100 parts by weight of elastomer (phr). Table 5 also compares the cured properties of Control Sample N and Experimental Samples O and P.

TABLE 5

| | Control | Experimental | |
|---|---|---|---|
| | N* | O** | P |
| BR | 44 | 45.4 | 45.4 |
| ESBR | 31 | 0 | 0 |
| Natural Rubber | 0 | 36 | 45 |
| SSBRA[1] | 30 | 0 | 0 |
| SSBRB[2] | 0 | 18.6 | 9.6 |
| Resin A[3] | 20 | 0 | 0 |
| Resin B[4] | 0 | 40 | 40 |
| Silica[5] | 95 | 105 | 105 |
| Carbon Black (petroleum based) | 2 | 0 | 0 |
| Carbon Black (bio-based)[6] | 0 | 2 | 2 |
| Percent (%) recycled/renewable | 47 | 72 | 75 |
| Viscosity, RPA at 100° C. | | | |
| G', 15% (MPa) | 0.213 | 0.168 | 0.170 |
| Stiffness | | | |
| RPA G', 1% (MPa) | 4.320 | 2.864 | 3.242 |
| RPA G' 50% (MPa) | 0.900 | 0.552 | 0.548 |
| ARES at 30° C., G' (Pa) | 4.49E±06 | 3.34E±06 | 3.60E±06 |
| Chip/Flake | | | |
| True Tensile | 133 | 90 | 109 |
| Wet Indicator | | | |
| Rebound at 0° C. (%) | 20.9 | 14.5 | 15.5 |
| ARES TD at 0° C. | 0.451 | 0.496 | 0.456 |
| Wear Indicators | | | |
| DIN Abrasion (relative volume loss) | 53 | not tested | 50 |
| Grosch Abrasion High Severity (mg/km) | 626 | 485 | 481 |
| Snow Indicator | | | |
| ARES G' at −20° (Pa) | 1.39E±07 | 1.16E±07 | 1.14E±07 |
| RR Indicator | | | |
| Rebound at 60° C. (%) | 42.0 | 42.4 | 40.7 |
| ARES TD at 30° C. | 0.331 | 0.346 | 0.340 |

*Same formula as Control Samples A, D, F and K, above
**Same formula as Sample M, above
[1]SBR, 33% styrene, 20 phr oil extended
[2]SSBR, 21% styrene, functionalized, Sn
[3]Alphamethyl styrene resin
[4]Bio-based terpene resin obtained as SYLVATRAXX 8115 from Kraton Chemical
[5]Rice husk ash silica
[6]Carbon black derived from $CO_2$ feedstock Prior to this example, Sample M demonstrated the most favorable performance results. In Example 5, the ratio blend of the three polymers were adjusted and compared to Sample M. This adjustment resulted in a polymer Tg shift (FOX calculation) from −80.0° C. to −82.6° C.

The increase in the natural rubber content of Experimental Sample P demonstrated an increase in compound stiffness and true tensile. Sample P improved wet, wear and snow indicators compared to Control N while also containing a substantial percent increase in renewable material content. The rolling resistance indicators were also equivalent to or improved on Control N and Sample O.

Table 6

Experimental Sample R is the same formula as Sample P, supra. In Sample S, the ESBR was replaced with a greater amount of natural rubber. All other ingredients and amounts remained the same. This change led to a further increase in the percent amount of renewable material (content) in the composition.

The rubber compounds were then cured and tested for various properties including, inter alia, wear, wet traction, and rolling resistance, etc.

The basic formulations are shown in the following Table 6, which is presented in parts per 100 parts by weight of elastomer (phr). Table 6 also compares the cured properties of Control Sample Q and Experimental Samples R and S.

TABLE 6

|  | Control | Experimental | |
|---|---|---|---|
|  | Q* | R** | S |
| BR | 44.0 | 45.4 | 17.0 |
| ESBR | 31 | 0 | 0 |
| Natural Rubber | 0 | 45 | 83 |
| SSBR A[1] | 30 | 0 | 0 |
| SSBR B[2] | 0 | 9.6 | 0 |
| Resin A[3] | 20 | 0 | 0 |
| Resin B[4] | 0 | 40 | 40 |
| Silica[5] | 95 | 105 | 105 |
| Carbon Black (petroleum based) | 2 | 0 | 0 |
| Carbon Black (bio-based)[6] | 0 | 2 | 2 |
| Percent (%) recycled/renewable | 45 | 75 | 88 |
| Viscosity, RPA at 100° C. | | | |
| G', 15% (MPa) | 0.234 | 0.169 | 0.152 |
| Stiffness | | | |
| RPA G', 1% (MPa) | 4.605 | 3.441 | 3.285 |
| RPA G' 50% (MPa) | 0.876 | 0.522 | 0.495 |
| ARES at 30° C., G' (Pa) | 5.87E+06 | 4.27E+06 | 3.65E+06 |
| Chip/Flake | | | |
| True Tensile | 142 | 107 | 102 |
| Wet Indicator | | | |
| Rebound at 0° C. (%) | 21.5 | 17.0 | 14.5 |
| ARES TD at 0° C. | 0.397 | 0.419 | 0.469 |
| Snow Indicator | | | |
| ARES G' at −20° (Pa) | 1.82E+07 | 1.40E+07 | 1.22E+07 |
| RR Indicator | | | |
| Rebound at 60° C. (%) | 43.3 | 42.8 | 43.3 |
| ARES TD at 30° C. | 0.306 | 0.318 | 0.354 |

*Same formula as Control Samples A, D, F, K, and N above
**Same formula as Sample P, above
[1]SSBR, 33% styrene, 20 phr oil extended
[2]SSBR, 21% styrene, functionalized, Sn
[3]Alphamethyl styrene resin
[4]Bio-based terpene resin obtained as SYLVATRAXX 8115 from Kraton Chemical
[5]Rice husk ash silica
[6]Carbon black derived from $CO_2$ feedstock To further test an increase to the percent amount of renewable content in a tread, the SBR was removed and replaced with additional natural rubber. Also, in this example the natural rubber made up the majority content, at a substantial increase, of rubber polymer in the blend. This resulted in a polymer Tg (FOX calculation) shift from −82.6° C. to −72.3° C.

The polymer adjustments resulted in a slight decrease in compound stiffness.

The increase in natural rubber level increased the percent of renewable content in the rubber composition from 47% weight (Control Q) to 88% weight (Experimental Sample S). Sample S showed improved wet and snow indicators over Control Q, and it also indicated an equivalent rolling resistance.

It is concluded that a tread tire rubber composition formed having a majority percent of renewable content from a combination of different renewable materials can meet or improve the performance of a tire formed from a conventional rubber composition.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire component formed from a rubber composition comprising a majority weight percent of bio-renewable materials excluding fossil or radiocarbon materials derived from petroleum, coal or a natural gas source, the rubber composition comprising, based on 100 parts per weight (phr) of elastomer:
   a blend of at least two rubber elastomers selected from a group consisting of:
      from about 40 phr to about 50 phr polybutadiene;
      up to about 35 phr of styrene-butadiene copolymer;
      up to about 45 phr of natural rubber;
   a bio-derived resin material excluding fossil or radiocarbon materials derived from petroleum, coal or a natural gas source; and
   a bio-derived filler comprising silica and carbon black filler, the bio-derived filler excluding fossil or radiocarbon materials derived from petroleum, coal or a natural gas source wherein said carbon black filler is at least partially derived from a bio-based feedstock prior to its addition to the rubber composition.

2. The tire component of claim 1, wherein the rubber composition comprises greater than about 75% of renewable material excluding fossil or radiocarbon materials derived from petroleum, coal or a natural gas source.

3. The tire component of claim 1, wherein the rubber composition comprises greater than about 85% of renewable material excluding fossil or radiocarbon materials derived from petroleum, coal or a natural gas source.

4. The tire component of claim 1, wherein the resin is a terpene resin.

5. The tire component of claim 1, wherein the resin is an alpha pinene resin.

6. The tire component of claim 1, wherein the composition excludes one or more of a petroleum-derived resin, a petroleum-derived oil, and a petroleum-derived filler material.

7. The rubber composition of claim 1, wherein the blend of rubber elastomers comprises optionally up to 35 phr of emulsion polymerized styrene butadiene copolymer (ESBR).

8. The rubber composition of claim 1, wherein the blend of rubber elastomers excludes emulsion polymerized styrene butadiene copolymer (ESBR).

9. The rubber composition of claim 1, wherein the blend of rubber elastomers comprises from about 5 to about 30 phr of solution polymerized styrene butadiene copolymer (SSBR).

10. The rubber composition of claim 9, wherein the SSBR is oil extended.

11. The rubber composition of claim 9, wherein the SSBR is functionalized.

12. The rubber composition of claim 9, wherein the SSBR is not functionalized.

13. The rubber composition of claim 9, wherein the blend of rubber elastomers comprises from about 5 to about 15 phr of functionalized SSBR.

14. The rubber composition of claim 1, wherein the blend of rubber elastomers comprises from about 35 phr to about 45 phr of natural rubber.

15. The rubber composition of claim 14, wherein the blend of rubber elastomers further excludes ESBR.

16. The rubber composition of claim 1 wherein the silica is present at from about 80 phr to about 150 phr and the silica is present from 1 to about 15 phr of carbon black.

17. The rubber composition of claim 1, wherein the silica is derived from rice husk ash.

18. The rubber composition of claim 1 further comprising from about 10 phr to about 50 phr of resin.

19. The tire component of claim 1, wherein, prior to its addition to the rubber composition, the carbon black is produced from a feedstock that excludes fossil carbon.

* * * * *